(12) United States Patent
Wei (10) Patent No.: US 10,142,609 B2
(45) Date of Patent: Nov. 27, 2018

(54) DYNAMICALLY ADJUSTABLE SITUATIONAL AWARENESS INTERFACE FOR CONTROL OF UNMANNED VEHICLES

(71) Applicant: Jerome H. Wei, La Habra, CA (US)

(72) Inventor: Jerome H. Wei, La Habra, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 267 days.

(21) Appl. No.: 14/699,733

(22) Filed: Apr. 29, 2015

(65) Prior Publication Data
US 2017/0041587 A1    Feb. 9, 2017

(51) Int. Cl.
| | | |
|---|---|---|
| *H04N 13/00* | (2018.01) | |
| *H04N 7/18* | (2006.01) | |
| *G05D 1/00* | (2006.01) | |
| *H04N 13/161* | (2018.01) | |
| *H04N 13/139* | (2018.01) | |
| *H04N 13/167* | (2018.01) | |
| *H04N 13/25* | (2018.01) | |
| *H04N 13/254* | (2018.01) | |
| *B64C 39/02* | (2006.01) | |

(52) U.S. Cl.
CPC ......... *H04N 13/161* (2018.05); *B64C 39/024* (2013.01); *G05D 1/0011* (2013.01); *H04N 7/181* (2013.01); *H04N 7/185* (2013.01); *H04N 13/139* (2018.05); *H04N 13/167* (2018.05); *H04N 13/25* (2018.05); *H04N 13/254* (2018.05); *B64C 2201/123* (2013.01); *B64C 2201/127* (2013.01); *B64C 2201/14* (2013.01); *B64C 2201/146* (2013.01)

(58) Field of Classification Search
CPC .. H04N 13/0048; H04N 7/181; H04N 13/025; H04N 13/0051; H04N 13/0029; H04N 13/0253; G05D 1/0011

USPC .......................................................... 348/43
See application file for complete search history.

(56) References Cited

U.S. PATENT DOCUMENTS

| | | | | |
|---|---|---|---|---|
| 4,855,822 A | * | 8/1989 | Narendra | G05D 1/0038 |
| | | | | 348/114 |
| 9,041,772 B2 | * | 5/2015 | Suh | H04N 13/0059 |
| | | | | 348/42 |
| 2003/0164794 A1 | * | 9/2003 | Haynes | H04B 1/7172 |
| | | | | 342/353 |

(Continued)

FOREIGN PATENT DOCUMENTS

WO    WO 2013/074172 A2    5/2013

OTHER PUBLICATIONS

International Search Report for corresponding PCT/US2016/028449.

*Primary Examiner* — Zaihan Jiang (74) *Attorney, Agent, or Firm* — Tarolli, Sundheim, Covell & Tummino LLP (57) ABSTRACT

An apparatus includes an image collection module that monitors at least one parameter to dynamically regulate an amount of data and resolution to be allocated to at least one object in a scene collected from an image data set. A situational awareness interface (SAI) renders a 3-D video of the scene to an operator based on the amount of data and resolution allocated from the image data set by the image collection module and receives operator commands for an unmanned vehicle (UV) that interacts with the scene.

18 Claims, 7 Drawing Sheets

(56) References Cited

U.S. PATENT DOCUMENTS

| | | | |
|---|---|---|---|
| 2006/0077255 A1* | 4/2006 | Cheng | G06K 9/0063 |
| | | | 348/143 |
| 2008/0060034 A1* | 3/2008 | Egnal | G01C 11/02 |
| | | | 725/105 |
| 2009/0073034 A1* | 3/2009 | Lin | G01S 19/49 |
| | | | 342/357.32 |
| 2010/0040279 A1* | 2/2010 | Yoon | G05D 1/0251 |
| | | | 382/153 |
| 2010/0106344 A1* | 4/2010 | Edwards | E02F 9/205 |
| | | | 701/2 |
| 2010/0114408 A1 | 5/2010 | Goossen | |
| 2011/0187563 A1 | 8/2011 | Sanders-Reed | |
| 2012/0283585 A1* | 11/2012 | Werneth | A61B 17/0057 |
| | | | 600/508 |
| 2012/0306741 A1* | 12/2012 | Gupta | G06F 3/04815 |
| | | | 345/156 |
| 2013/0253733 A1* | 9/2013 | Lee | B64C 19/00 |
| | | | 701/2 |
| 2015/0215516 A1* | 7/2015 | Dolgin | H04N 5/23293 |
| | | | 348/169 |
| 2015/0235435 A1* | 8/2015 | Miller | G06T 19/006 |
| | | | 345/633 |
| 2016/0122038 A1* | 5/2016 | Fleischman | G06T 7/73 |
| | | | 701/2 |
| 2016/0247407 A1* | 8/2016 | Paczan | G08G 5/045 |
| 2016/0259330 A1* | 9/2016 | Lacaze | G05D 1/0016 |

* cited by examiner

FIG. 7

DYNAMICALLY ADJUSTABLE SITUATIONAL AWARENESS INTERFACE FOR CONTROL OF UNMANNED VEHICLES

GOVERNMENT INTEREST

The invention was made under Air Force Research Laboratories Contract Number FA8650-11-C-3104. Therefore, the U.S. Government has rights to the invention as specified in that contract.

TECHNICAL FIELD

This disclosure relates to control systems, and more particularly to a system and method to dynamically adjust a situational awareness interface for control of unmanned vehicles.

BACKGROUND

Most unmanned systems require specialized training to operators that require commanders to budget and plan for specialized personnel within an organizational unit. This is impractical in many situations where the specialized training requires months or even years of training prior to proper employment of the unmanned system. Typically, unmanned systems are developed to be focused on unmanned vehicles and sensors, with the user interface being engineered to saturate the operator with data. Current unmanned systems are limited in the effectiveness of direct operator control due to information quality and communications factors, for example. Onboard sensors may not provide sufficient field of view, resolution, or update rate to support operations in highly complex, dynamic environments. Limited bandwidth and latency can degrade quality and timeliness of information from the vehicle to the operator, and delay of user inputs can reduce vehicle controllability. Additionally, presentation of situational awareness information to the operator, and medium of control input from the operator can severely degrade connection between the operator and the vehicle.

SUMMARY

This disclosure relates to a system and method to dynamically adjust a situational awareness interface for control of unmanned vehicles. In one aspect, an apparatus includes an image collection module that monitors at least one parameter to dynamically regulate an amount of data and resolution to be allocated to an area in a scene collected from an image data set. A situational awareness interface (SAI) renders a 3-D video of the scene to an operator based on the amount of data and resolution allocated from the image data set by the image collection module and receives operator commands for an unmanned vehicle (UV) that interacts with the scene.

In another aspect, a system includes a first sensor configured to generate an electro-optical (EO) image data set characterizing a scene. The system includes a second sensor configured to generate a Laser Illuminated Detection and Ranging (LIDAR) image data set characterizing the scene. An image collection module dynamically regulates an amount of data and resolution to be allocated to at least one object within an area of the scene from the EO image data set and the LIDAR image data set based on at least one parameter to generate a fused image data set to provide a 3-D video of the scene. A situational awareness interface renders the 3-D video of the scene from the fused image data set to an operator and to receive operator commands for an unmanned vehicle (UV) that interacts with the scene.

In yet another aspect, a method includes receiving image data sets from at least two sensors. The method includes fusing the image data sets to generate a 3-D scene for an operator of an unmanned vehicle (UV) based on the image data sets. This includes determining an available bandwidth to render the scene at an interface for the operator. The method includes adjusting the resolution of an area in the scene based on the available bandwidth.

DETAILED DESCRIPTION

This disclosure relates to a system and method to dynamically adjust a situational awareness interface for control of unmanned vehicles. This includes generating a three-dimensional (3-D) video (e.g., a 3-D panoramic video) of a scene via a situational awareness interface (SAI) from onboard sensors mounted on an unmanned vehicle (UV). A controller can interact with the SAI to enable operator interactions and gestures received from the SAI to control the UV. The system can include an omni-directional sensor (e.g., a Lady-Bug Sensor) for generating electro-optical (EO) images of the scene corresponding to an EO sensor data set, for example. Other sensor data can include a Laser Illuminated Detection and Ranging (LIDAR) sensor for generating LIDAR images of the scene corresponding to a LIDAR sensor data set, for example. The system further includes an image collection module for gathering and processing sensor data such as the EO sensor data with the LIDAR sensor data (and/or other sensor data) to generate an image data set. The image data set can be transmitted across a (wireless) network link to a device (e.g., a virtual reality headset or a 3-D monitor) for rendering the 3-D video of the scene for an operator of the UV in real-time.

The image collection module can be configured to dynamically regulate an amount of data (elements) that will be used from the sensor data sets to generate the image data set, which consequently controls a richness level (version) of the 3-D video of the scene presented to the operator via the SAI. The system dynamically regulates the amount of data and/or resolution that will be used from each sensor data set to determine a data size and/or rendering quality of the image data set based on at least one parameter. For instance, the parameter can be determined based on an amount of bandwidth available in the network link, an amount of data captured by the EO and the LIDAR sensor, and/or a processing capability of the system. Dynamically regulating the richness of the 3-D video of the scene based on the parameter (or parameters) enables the operator to continue viewing the scene in real-time, for example, during bandwidth degraded conditions in the network link, but at a lower richness level (e.g., with background objects omitted from the 3-D video of the scene, the 3-D video of the scene at a lower resolution, and so forth).

The system can be further configured to utilize a least amount of bandwidth available in the network link based on a priori knowledge of background objects of the scene and by distilling the sensor data into world states. For example, the image fusion module can be configured to analyze the LIDAR data set (or in some applications just the EO data set or both sets) and select model objects from a model database to represent objects (e.g., background objects) within the scene. The image fusion collection can also generate an augmented version of the image data set based on the selected model objects, and a corresponding version of the image data set. This can include annotations within the scene to assist the operator with command and control decisions for the UV.

Figure 1:
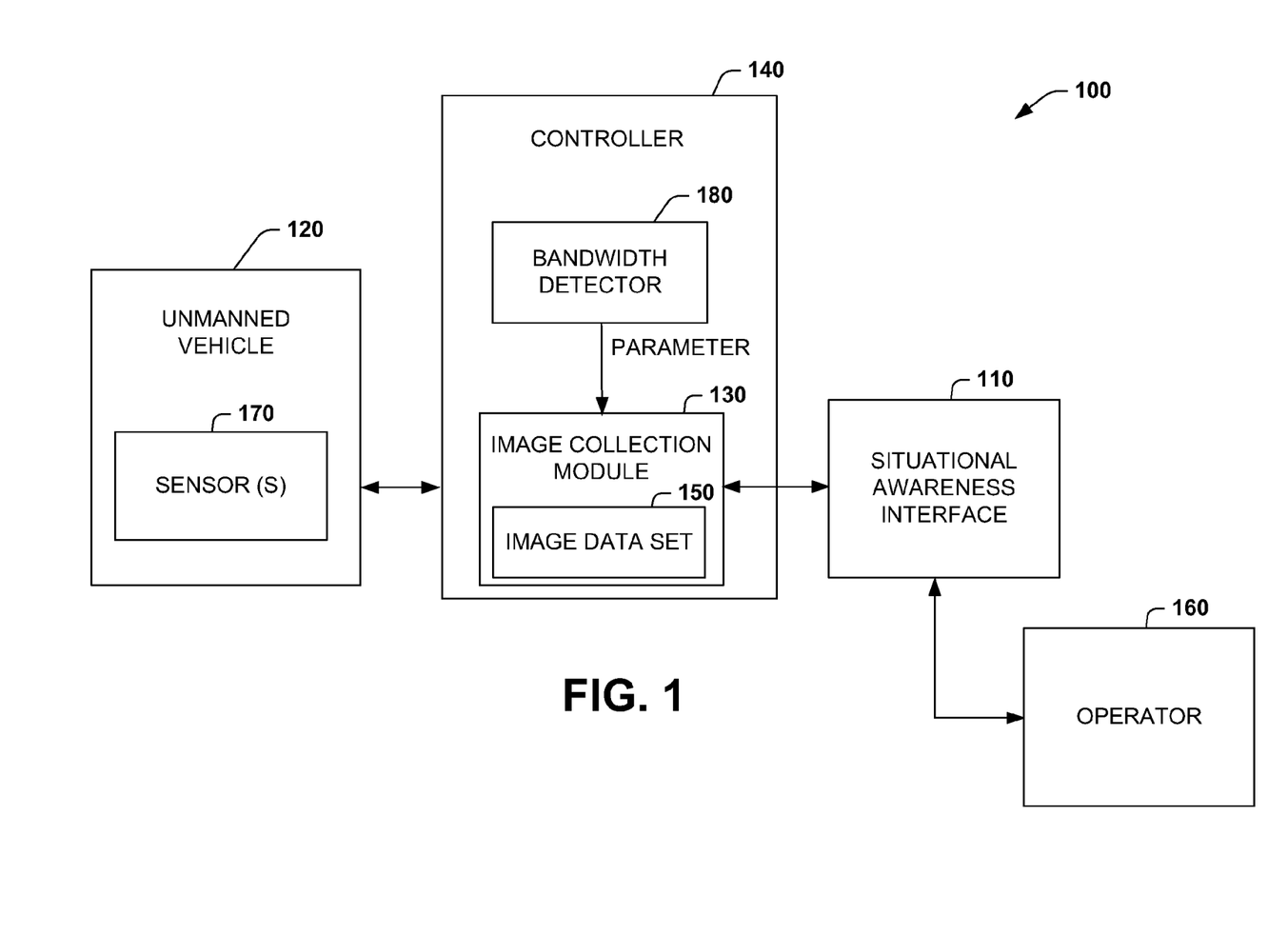
FIG. 1 illustrates an example of a system to dynamically adjust a situational awareness interface for control of unmanned vehicles.

FIG. 1 illustrates an example of a system 100 to dynamically adjust a situational awareness interface (SAI) 110 for control of unmanned vehicles (UV) 120. An image collection module 130 associated with a controller 140 monitors at least one parameter to dynamically regulate an amount of data and resolution to be allocated to at an area in a scene collected from an image data set 150. As used herein, the term area refers to the rendered image presented to the operator that is based on the collected sensor data representing the collective field of view of UV. The area can include the entire field of view and can also include objects within the field of view. The situational awareness interface (SAI) 110 renders a 3-D video of the scene to an operator 160 based on the amount of data and resolution allocated from the image data set 150 by the image collection module 130. The SAI receives operator commands from the operator 160 that are directed to control the unmanned vehicle (UV) 120 that interacts with the scene. For example, the UV 120 can include one or more sensors 170 which are mounted onboard the UV 120 to generate data that can be collected and processed in the image data set 150 to generate the scene as observed from the point of view of the UV, where the operator 160 can view the scene via the SAI 110. A bandwidth detector 180 determines available bandwidth and/or resolution that can be rendered for a given scene. The bandwidth detector 180 can include software and/or hardware components that receive information regarding the current network transmission conditions for both collecting the image data set 150 and/or for sending scene data to the SAI 110.

The bandwidth detector 180 can monitor a plurality of varying network performance data to generate the parameter to indicate how the given scene should be rendered by the by the SAI 110 via the image collection module 130. This can include altering the entire resolution of the given scene from high resolution under good bandwidth conditions to adjusting the resolution of the scene to lower resolution to accommodate poor network capabilities. In some cases, the entire scene can be adjusted for higher or lower resolution. In other examples, a particular object rendered within the scene can be rendered at a higher resolution whereas other objects can be rendered at lower resolution based on operator feedback or predetermined polices and/or detected conditions. Also, bandwidth trade-offs can be made to determine how much data to transmit versus onboard processing (e.g., processing onboard UV and/or processing at image collection module). This can include decisions or policies regulating how much onboard processing should take place given versus available bandwidth to further recognize and characterize objects and then sending a compressed representation, for example, or sending raw data in another example.

The parameter provided by the bandwidth detector 180 can indicate an amount of available bandwidth in which to render the image data set, a quality of service parameter from a network service provider, a data per second parameter indicating current network performance, or a resolution parameter to indicate an amount of detail to be rendered for the 3-D video scene, for example. The SAI 110 can provide feedback from the operator to the image collection module 130 to allocate resolution bandwidth to a particular object within the scene, wherein the feedback can include a voice command, a gaze tracking device input, or a cross hair adjustment via a joystick input, for example, where the feedback indicates objects of interest to be rendered at higher resolution (if possible) from other objects within the scene.

In a specific sensor example, the image collection module 130 can process data collected from at least two data sets that are generated from at least two sensors that includes an electro-optical (EO) sensor data set and a Laser Illuminated Detection and Ranging (LIDAR) image sensor data set, for example. Other sensors 170 can include an acoustic sensor, an infrared sensor, an ultraviolet sensor, and/or a visible light sensor, for example. Although not shown, the UV 120 can include an onboard flight/ground controller to react to operator commands provided by the controller 140. The UV 120 can be an airborne system such as a helicopter or an airplane or can be a ground device such as a car, truck, or military asset, for example.

The system 100 can provide a full definition, substantially zero latency immersion or transfer of consciousness from the operator 160 to onboard the UV 120 to allow seamless control as if a piloted aircraft or ground vehicle. To support autonomous operations, a rich set of sensors 170 can provide quality, timely information about the external environment to be utilized onboard unmanned vehicles 120. The aggregated and associated information from these sensors 170 can also be leveraged to provide the operator 160 the same situational awareness as available to the autonomous control system. While this may entail high bandwidth communications, it would allow for a high transference of awareness and enable high fidelity control. For certain operating environments, such as the terminal area, this capability may be possible and necessary to maintain safety in difficult situations. Additionally, various technologies in presenting 3D information and allowing control input can be utilized to further improve control efficiency and precision. For example, the system 100 can combine five electro optical (EO) images from a Ladybug sensor with a 3D LIDAR point cloud from a Velodyne Lidar sensor into a single fused data set. The resulting information contained within the aggregated/collected/fused data set can be a seamless panoramic view of the environment (e.g., the area) with each data element or object in the set providing color and 3D position of the environment.

Figure 2:
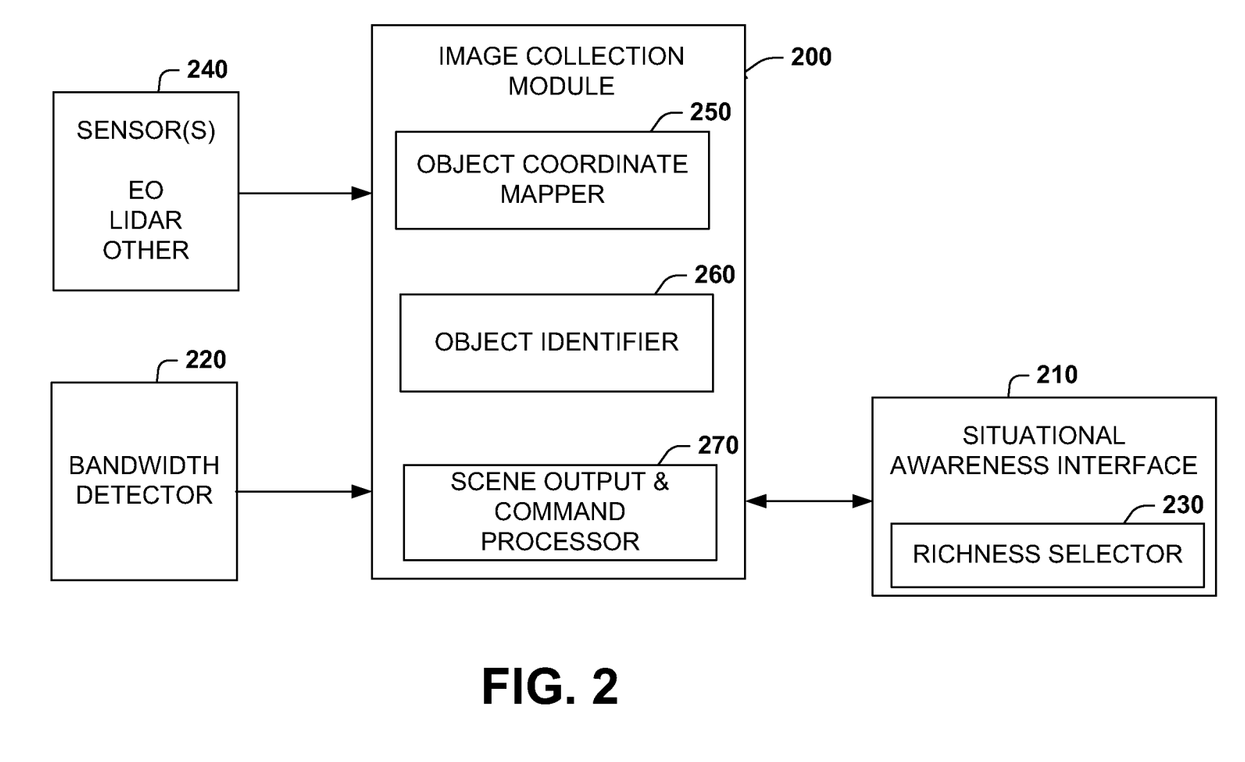
FIG. 2 illustrates an example of an image fusion module to dynamically adjust a situational awareness interface for control of unmanned vehicles.

FIG. 2 illustrates an example of an image fusion module 200 to dynamically adjust a situational awareness interface (SAI) 210 for control of unmanned vehicles. As noted previously, the image collection module can monitor at least one parameter from a bandwidth detector 220 to dynamically regulate an amount of data and resolution to be allocated to an area in a scene collected from an image data set. The SAI 210 renders a 3-D video of the scene to an operator based on the amount of data and resolution allocated from the image data set by the image collection module 200. The SAI 210 can include a richness collection module 230 to provide feedback from the operator to the image collection module 200 to allocate resolution bandwidth to a particular object within the scene. For example, the feedback can include a voice command, a gaze tracking device input, or a cross hair adjustment via a joystick input, where the feedback indicates which objects in the scene the operator would like to see rendered at a higher resolution if possible based on detected bandwidth conditions.

In one specific example, the image collection module 200 can collect image data from a first sensor 240 configured to generate an electro-optical (EO) image data set characterizing a scene. A second sensor at 240 can be configured to generate a Laser Illuminated Detection and Ranging (LIDAR) image data set characterizing the scene. In this example, the image collection module 200 dynamically regulates an amount of data and resolution to be allocated to at least one object within an area of the scene from the EO image data set 240 and the LIDAR image data set based on at least one parameter to generate a fused image data set to provide a 3-D video of the scene to the SAI 210.

The image collection module 250 includes an object coordinate mapper 250 to map situational data received from the sensors 240 to video coordinates of the 3-D video scene. This can include X, Y, Z rectangular coordinate mapping and/or radial mapping where a radius from a given target is specified at a given angle, for example. A calibration protocol for determining the mapping is illustrated and described below with respect to FIG. 3. The image collection module 200 can also include an object identifier 260 to determine object types detected in the scene (e.g., cars, trucks, trees, dumpsters, people, and so forth). In one specific example, the object identifier 260 can include a classifier (or classifiers) to determine the object types based on probabilities associated with a shape or frequency band emitted from the object and as detected by the sensors 240. One example classifier is a support vector machine (SVM) but other types can be employed to identify objects.

After objects have been identified, object classifications, procedural data, or operational data can be overlaid on to the 3-D scene to facilitate situational awareness of the operator. As shown, the image collection module 200 can include scene output generator and command processor 270 to both provide scene output to the SAI 210 and to receive operator feedback and/or control commands via the SAI. The SAI 210 can also include a virtual reality headset or multiple monitors to render the 3-D scene to the operator, for example (See e.g., FIG. 4).

Figure 3:
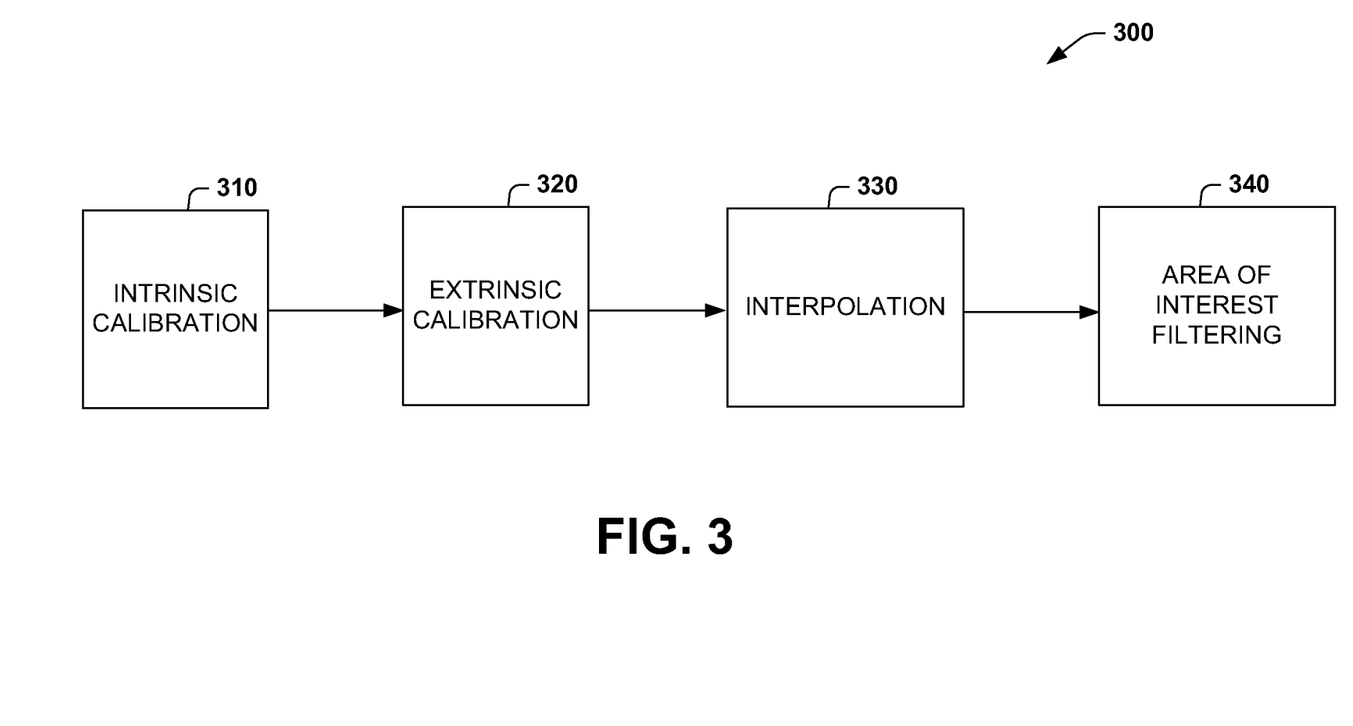
FIG. 3 illustrates an example of a calibration procedure for an image fusion module and interface.

FIG. 3 illustrates an example of a calibration procedure 300 for an image fusion module and interface. In order to gather sensor data for the image collection module described herein, various calibration procedures can be performed to map gathered sensor data to scene objects presented to the operator via the SAI described herein. At 310, an intrinsic calibration can be performed where lens focal lengths (e.g., lens for gathering data onto the sensor) can be accounted for, principal object data points determined, image skew factors determined, along with radial & tangential distortion factors. At 320, an extrinsic calibration can be performed where parameters and coordinates can be determined such as distance to the plane (e.g., as perceived by the operator), unit normal to the plane, a given point on the plane, a determination or rotation between LIDAR and a respective camera head, and a transformation between LIDAR to camera head, for example. After extrinsic calibration 320, data can be interpolated (e.g., data from sensors plotted into a X, Y, Z, 3-D coordinate system) at 330 and rendered as an area (or object) of interest via a filtering at 340, where area refers to a rendered field of view as observed by the operator.

Given knowledge of the sensors' intrinsic and extrinsic calibration parameters, data association between each sensor can be performed by a transformation of coordinate frames along with correction offsets for sensor distortion followed by sensor data interpolation, as shown in FIG. 3. The collected data set can be expected to be more complete as the two (or more) complementary data types (e.g., 3D LIDAR and EO images) are combined. The resultant rich, 3D data can readily be presented via a virtual reality headset or 3D monitors to provide detailed spatial awareness to the operator. Even beyond 3D relationships and colors, fusion of other sensors (IR, Acoustic, and so forth) can produce even higher dimensional data that can be presented to the operator. Due to parallax, depth perception of faraway points is not as impacted by 3D presentation, but for close-in objects, 3D presentation can have a dramatic effect. Particularly for close-in movements such as parking or navigating indoor or urban environments, this improvement of presentation of spatial awareness can enhance effectiveness of control.

Figure 4:
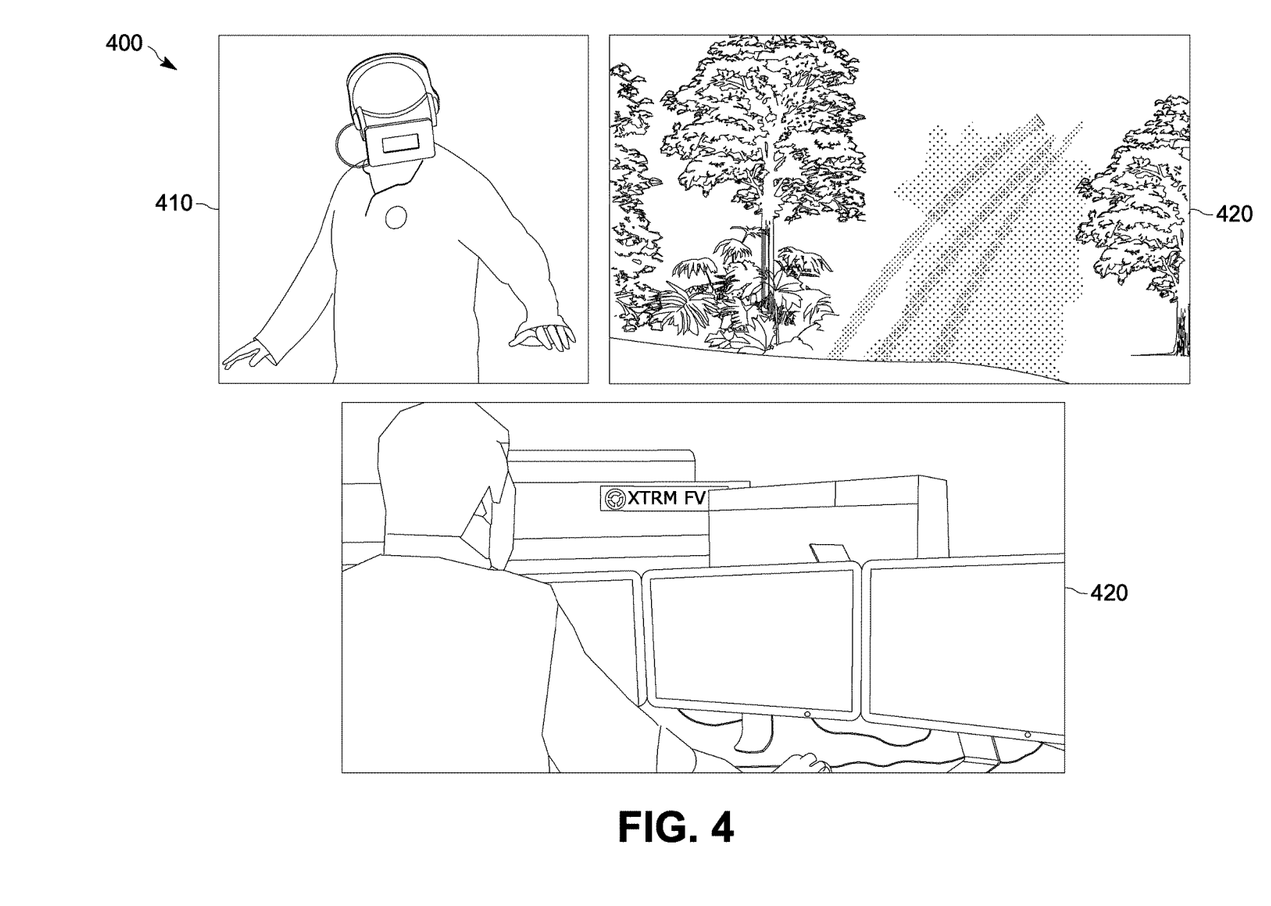
FIG. 4 illustrates an example of situational awareness interfaces for control of unmanned vehicles.

FIG. 4 illustrates an example of situational awareness interfaces 400 for control of unmanned vehicles. At 410, a operator is shown wearing a virtual reality headset to both see the rendered video scene shown at 420 but to also provide command feedback to the unmanned vehicle via the headset or other apparatus. This can include voice commands, commands based on eye movements, or commands received from the operators hands such as shown in the examples of FIG. 6. In an alternative example for observing the rendered scene, multiple output monitors can be monitored (e.g., via 3-D glasses) by the operator such as shown at 420. The rendered scene 420 is rendered at an overall lower resolution level based on available detected bandwidth. Various other rendering examples from higher to lower resolution are depicted and described with respect to FIG. 5.

Figure 5:
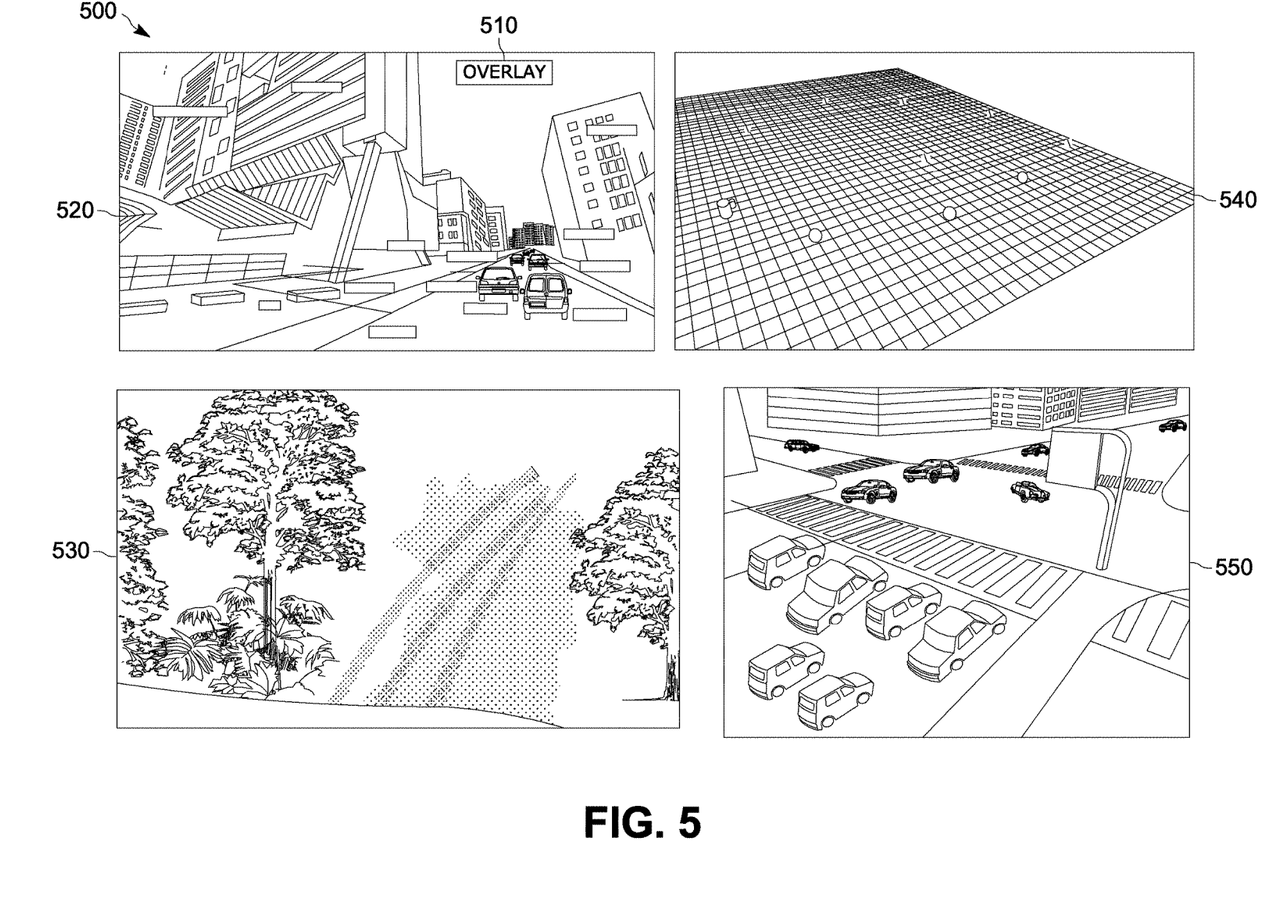
FIG. 5 illustrates example output renderings to a situational awareness interface display based on detected bandwidth parameters.
Figure 6:
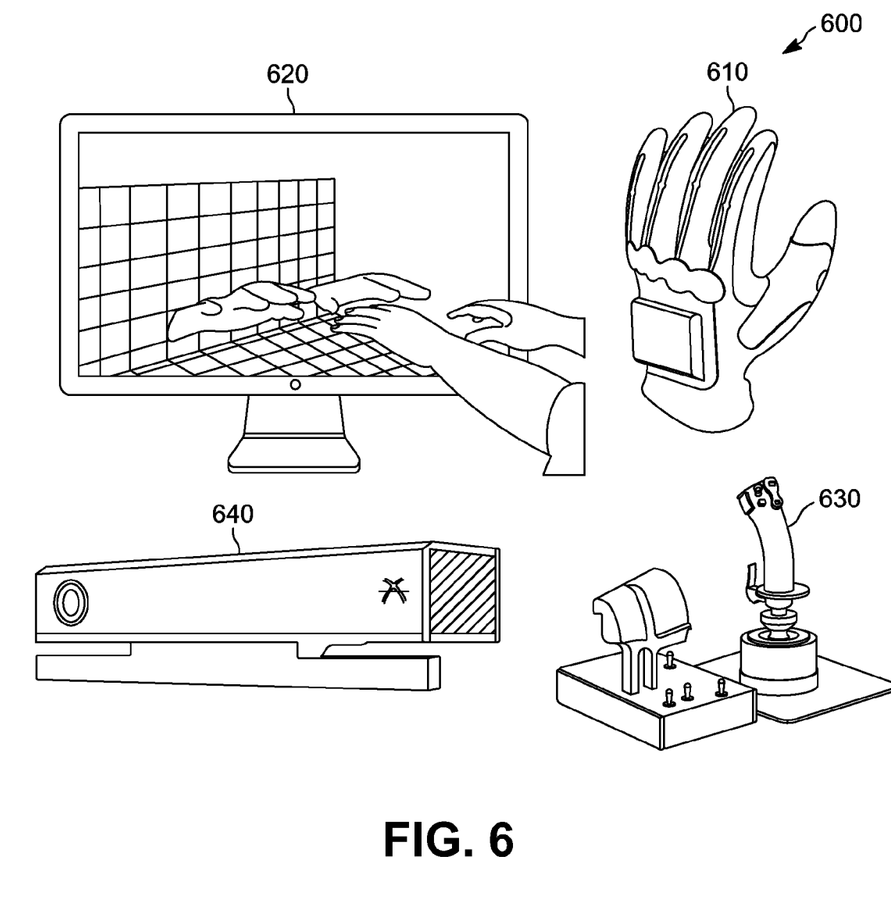
FIG. 6 illustrates example input devices that can be utilized to control an unmanned vehicle via a situational awareness interface and controller.

FIG. 5 illustrates example output renderings to a situational awareness interface display based on detected bandwidth parameters. Depending on availability of bandwidth, sensor data, and sensor processing, it is possible to present a hyper awareness to the operator beyond what is directly observable. Classifications, procedural data, and other operational information either extracted or known a priori can be overlaid at 510 and presented to the operator within the immersive 3D environment shown at 520 to facilitate situational awareness transference and control.

Information leveraged from the onboard autonomous capabilities can be used to improve operator awareness. If bandwidth constraints become a problem, just the fused sensor data can be presented, at full or degraded resolution such as shown at 530, or a primitive representation of discrete entities in 3D space as extracted by onboard sensor processing such as shown at 540. Another possible approach in one example requires the least amount of communication bandwidth but requires highly capable onboard processing and distilling of sensor information into world states and/or a priori knowledge of the environment to generate a high fidelity 3D rendering of the environment and objects utilizing only high level information of world states such as shown at 550. Presentation format, and subsequently bandwidth utilization, can be adjusted based on availability, complexity of situation to be resolved, and uncertainty of correct decision as assessed by the autonomous system, for example.

FIG. 6 illustrates example input devices 600 that can be utilized to control an unmanned vehicle via a situational awareness interface and controller. With regard to operator interaction, various technologies can be employed to direct control of unmanned vehicles. Body and finger gesture control interfaces via a glove at 610 or touch screen 620 can be used to read inputs from the operator. This can include tactile feedback technologies leveraged to ground the operator to virtual control interfaces in the immersive 3d environment. Intricate, natural interaction with virtual menus and control interfaces can increase operator control precision and reduce workload. Additionally, traditional stick 630 or wheel controllers at 640 can be used to provide direct input, with or without an immersive world representation.

Figure 7:
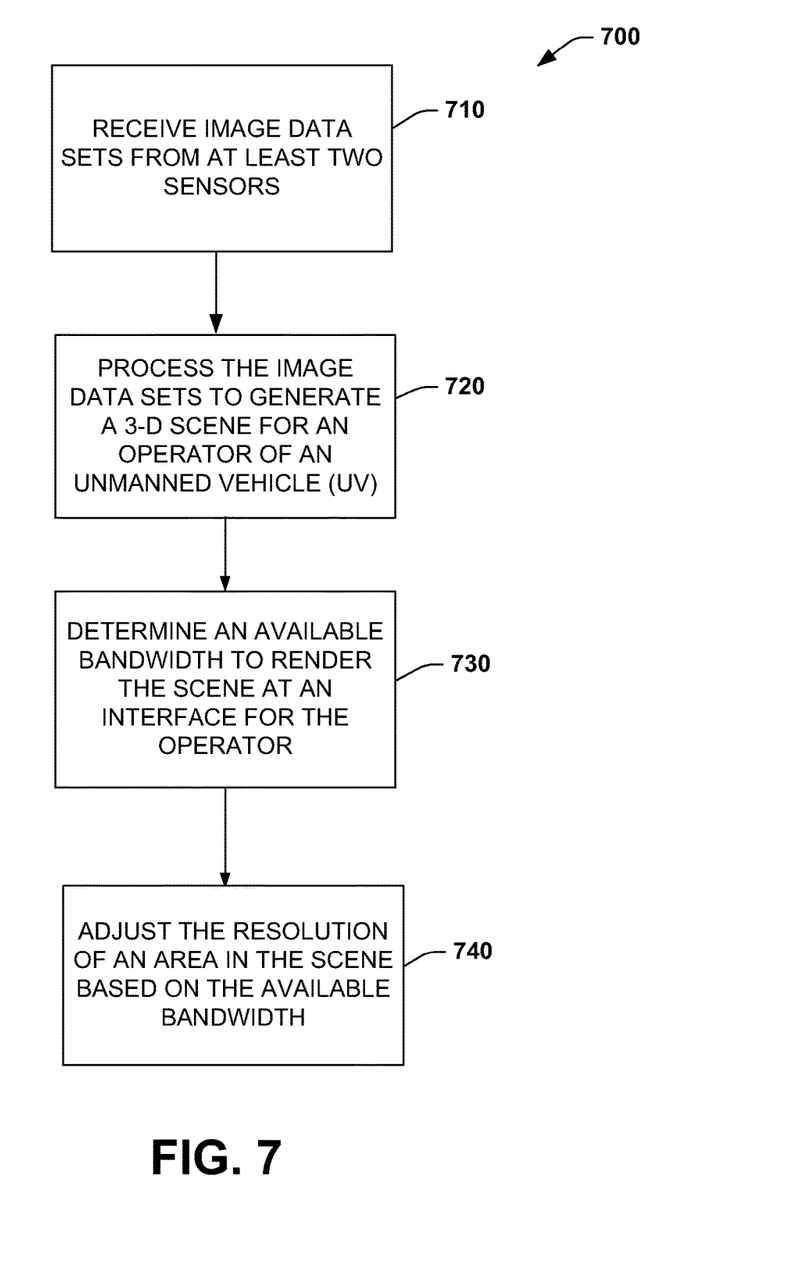
FIG. 7 illustrates an example of a method to dynamically adjust a situational awareness interface for control of unmanned vehicles.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 7 illustrates an example of a method 700 to dynamically adjust a situational awareness interface for control of unmanned vehicles. At 710, the method 700 includes receiving image data sets from at least two sensors (e.g., via sensors 170 of FIG. 1). At 720, the method 700 includes fusing the image data sets to generate a 3-D scene for an operator of an unmanned vehicle (UV) based on the image data sets (e.g., via image collection module 130 of FIG. 1). At 730, the method 700 includes determining an available bandwidth to render the scene at an interface for the operator (e.g., via bandwidth detector 180 of FIG. 1). At 740, the method 700 includes adjusting the resolution of an area (or object) in the scene based on the available bandwidth (e.g., via the image collection module 130 of FIG. 1). As noted previously, based on the detected bandwidth, resolution of the entire scene can be increased or decreased. In another example, resolution of a given object (or objects) within the scene can be increased while other objects in the scene can have their resolution decreased based on available bandwidth and/or operator feedback. Although not shown, the method 700 can also include classifying objects in the scene to determine object types based on probabilities associated with a shape or frequency band emitted from the object, for example.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus, comprising:
an image collection module that monitors at least one parameter to dynamically regulate an amount of data and resolution to be allocated to an area of a scene collected from an image data set, the image collection module including an object identifier having a classifier to determine object types detected in the area of the scene based on probabilities associated with a frequency band emitted from the object;
a situational awareness interface (SAI) to render a 3-D video of the scene to an operator based on the amount of data and resolution allocated from the image data set by the image collection module and to receive operator commands for an unmanned vehicle (UV) that interacts with the scene, the SAI receiving feedback from the operator to allocate resolution bandwidth to an object within the area of the scene; and
a bandwidth detector that, based on the feedback from the operator, renders the object in the scene at a first resolution and other objects in the scene at a second resolution where the first resolution is higher than the second resolution.

2. The apparatus of claim 1, wherein the at least one parameter indicates an amount of available bandwidth parameter in which to render the image data set, a quality of service parameter from a network service provider, a data per second parameter indicating current network performance, or a resolution parameter to indicate an amount of detail to be rendered for the 3-D video scene.

3. The apparatus of claim 2, wherein the SAI provides the feedback from the operator to the image collection module to allocate resolution bandwidth to the object within the area of the scene, and wherein the feedback includes a voice command, a gaze tracking device input, or a cross hair adjustment via a joystick input.

4. The apparatus of claim 1, wherein image collection module processes data from at least two data sets that are generated from at least two sensors that includes an electro-optical (EO) sensor data set, a Laser Illuminated Detection and Ranging (LIDAR) image sensor data set, an acoustic sensor, an infrared sensor, an ultraviolet sensor, and a visible light sensor.

5. The apparatus of claim 4, wherein the image collection module includes an object coordinate mapper to map situational data received from the sensors to video coordinates of the 3-D video scene.

6. The apparatus of claim 1, wherein the classifier determines the object types based on probabilities associated with a shape of the object.

7. The apparatus of claim 1, wherein the SAI includes a virtual reality headset or multiple monitors to render the 3-D scene to the operator.

8. The apparatus of claim 7, further comprising a controller to receive operator commands from the SAI and to send control commands to the UV based on the operator commands.

9. The apparatus of claim 7, wherein object classifications, procedural data, or operational data is overlaid on to the 3-D scene to facilitate situational awareness of the operator.

10. A system, comprising:
a first sensor that generates an electro-optical (EO) image data set characterizing a scene;
a second sensor that generates a Laser Illuminated Detection and Ranging (LIDAR) image data set characterizing the scene;

an image collection module that dynamically regulates an amount of data and resolution to be allocated to at least one object within an area of a scene from the EO image data set and the LIDAR image data set based on at least one parameter to generate a fused image data set to provide a 3-D video of the scene, the image collection module including an object identifier having a classifier to determine object types detected in the area of the scene based on probabilities associated with a frequency band emitted from the object;

a situational awareness interface (SAI) to render the 3-D video of the scene from the fused image data set to an operator and to receive operator commands for an unmanned vehicle (UV) that interacts with the scene, the SAI receiving feedback from the operator to allocate resolution bandwidth to an object within the area of the scene; and a bandwidth detector that, based on the feedback from the operator, renders the object in the scene at a first resolution and other objects in the scene at a second resolution where the first resolution is higher than the second resolution.

11. The system of claim 10, wherein the at least one parameter indicates an amount of available bandwidth parameter in which to render the image data set, a quality of service parameter from a network service provider, a data per second parameter indicating current network performance, or a resolution parameter to indicate an amount of detail to be rendered for the 3-D video scene.

12. The system of claim 10, wherein the SAI provides the feedback from the operator to the image collection module to allocate resolution bandwidth to the object within the area of the scene, and wherein the feedback includes a voice command, a gaze tracking device input, or a cross hair adjustment via a joystick input.

13. The system of claim 10, wherein image collection module fuses data from other data sets that includes an acoustic sensor, an infrared sensor, an ultraviolet sensor, and a visible light sensor.

14. The system of claim 13, wherein the image collection module includes an object coordinate mapper to map situational data received from the sensors to video coordinates of the 3-D video scene.

15. The system of 10, wherein the classifier determines the object types based on probabilities associated with a shape of the object.

16. The system of claim 10, further comprising a controller to receive operator commands from the SAI and to send control commands to the UV based on the operator commands.

17. A method, comprising:
receiving image data sets, via a controller, from at least two sensors,
fusing the image data sets, via the controller, to generate a 3-D scene for an operator of an unmanned vehicle (UV) based on the image data sets;
determining, via the controller, an available bandwidth to render the scene at an interface for the operator;
adjusting, via the controller, the resolution of an area in the scene based on the available bandwidth;
receiving feedback from the operator to allocate resolution bandwidth to an object within the area of the scene;
rendering, based on the feedback from the operator, the object in the scene at a resolution higher than a resolution of other objects in the scene; and
classifying objects in the scene to determine object types based on probabilities associated with a frequency band emitted from the object.

18. The method of claim 17, further comprising classifying objects in the scene to determine the object types based on probabilities associated with a shape of the object.

* * * * *